(12) United States Patent
Kawamura et al.

(10) Patent No.: US 9,952,780 B2
(45) Date of Patent: Apr. 24, 2018

(54) METHOD FOR RETRIEVING DATA FROM A TAPE DRIVE

(71) Applicant: International Business Machines Corporation, Armonk, NY (US)

(72) Inventors: Kousei Kawamura, Tokyo (JP); Koichi Masuda, Tokyo (JP); Sosuke Matsui, Tokyo (JP); Yutaka Oishi, Kanagawa (JP); Takahiro Tsuda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/194,618

(22) Filed: Jun. 28, 2016

(65) Prior Publication Data

US 2017/0371563 A1    Dec. 28, 2017

(51) Int. Cl.
 *G06F 3/06* (2006.01)
(52) U.S. Cl.
 CPC .......... *G06F 3/0613* (2013.01); *G06F 3/0629* (2013.01); *G06F 3/0638* (2013.01); *G06F 3/0686* (2013.01)
(58) Field of Classification Search
 CPC .... G06F 3/0686; G06F 3/0613; G06F 3/0638; G06F 3/0629
 USPC ........................................................ 711/111
 See application file for complete search history.

(56) References Cited

U.S. PATENT DOCUMENTS

| 8,209,508 | B2 | 6/2012 | Davis | |
|---|---|---|---|---|
| 8,756,351 | B2 | 6/2014 | Katagiri et al. | |
| 8,867,160 | B2 * | 10/2014 | Katagiri | G11B 5/5513 |
| | | | | 360/55 |
| 8,913,337 | B2 | 12/2014 | Katagiri et al. | |
| 9,036,286 | B2 * | 5/2015 | Fujihara | G06F 3/0613 |
| | | | | 360/55 |
| 2009/0077310 | A1 | 3/2009 | Ashton et al. | |

OTHER PUBLICATIONS

"IBM LTO Ultrium 6 Full High Tape Drive, Increased capacity and performance for cost- and energy-efficient data protection and preservation", IBM Systems and Technology Data Sheet, © Copyright IBM Corporation 2012, Dec. 2012, TSD03160-USEN-00, 4 pages.

* cited by examiner

*Primary Examiner* — Jasmine Song
(74) *Attorney, Agent, or Firm* — Edward J. Wixted, III (57) ABSTRACT

An input to read two or more data records stored to a tape medium on a tape drive is received. A starting point is determined. The starting point is a closest data record, of the two or more data records, to a current position of a tape head of the tape drive. A read order of the two or more data records is determined. The read order is determined using an algorithm and the determined starting point. The determined read order is sent to a host device. A first data record is determined. A first locate operation within the tape drive is performed. The first data record, of the two or more data records stored on the tape medium, based on the determined read order is read. The first data record, of the two or more data records stored on the tape medium, is sent to the host device.

17 Claims, 5 Drawing Sheets

METHOD FOR RETRIEVING DATA FROM A TAPE DRIVE

BACKGROUND

The present invention relates generally to the field of tape drive storage, and more particularly to retrieving data from a tape drive.

A tape drive may be used for data backup. In information technology, a backup, or the process of backing up, refers to the copying and archiving of computer data so it may be used to restore the original after a data loss event. Backups have two distinct purposes. The primary purpose is to recover data after its loss, be it by data deletion or corruption. The secondary purpose of backups is to recover data from an earlier time, according to a user-defined data retention policy, typically configured within a backup application for how long copies of data are required. Though backups represent a simple form of disaster recovery, and should be part of any disaster recovery plan, backups by themselves should not be considered a complete disaster recovery plan. One reason for this is that not all backup systems are able to reconstitute a computer system or other complex configuration such as a computer cluster, active directory server, or database server by simply restoring data from a backup. Since a backup system includes at least one copy of all data considered worth saving, the data storage requirements can be significant. Organizing this storage space and managing the backup process can be complicated.

SUMMARY OF THE INVENTION

Embodiments of the present invention include a computer-implemented method, computer program product, and system for retrieving data from a tape drive. In one embodiment, an input to read two or more data records stored to a tape medium on a tape drive is received. The input is received in a specific manner. A starting point is determined. The starting point is a closest data record, of the two or more data records, to a current position of a tape head of the tape drive. A read order of the two or more data records is determined. The read order is determined using an algorithm and the determined starting point. The determined read order is sent to a host device. A first data record is determined. A first locate operation within the tape drive to locate the first data record, of the two or more data records, stored on the tape medium, based on the determined read order, is performed. The first data record, of the two or more data records stored on the tape medium, based on the determined read order is read. The first data record, of the two or more data records stored on the tape medium, is sent to the host device.

DETAILED DESCRIPTION

Embodiments of the present invention provide for retrieving data from a tape drive. A tape drive is comparable to a hard drive with regard to the amount of data that may be stored and the data transfer rate, but falls short in terms of access time (i.e., the time to locate a particular data item on the tape compared to the hard drive). Embodiments of the present invention recognize that because the tape media may length (e.g., several hundreds of meters long), the access time may also be lengthy (e.g., several minutes long).

Embodiments of the present invention recognize that there may be a method, computer program product, and computer system for retrieving data from a tape drive. The method, computer program product, and computer system may use a new small computer system interface (SCSI) command that determines the order in which the data records stored on the tape drive will be read in the shortest amount of time based on the current position of the tape medium. It should be appreciated that use of the new SCSI command results in needing fewer "Locate" commands which shortens the overall read time of the tape medium.

The present invention will now be described in detail with reference to the Figures.

Figure 1:
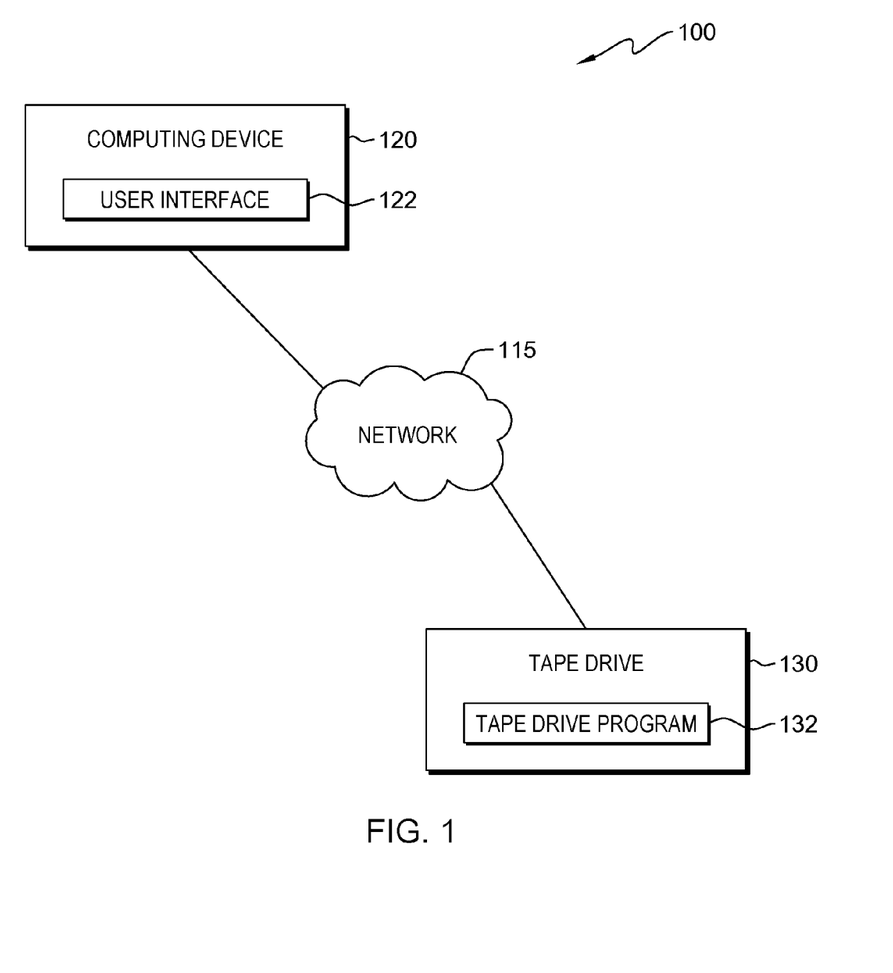
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes computing device 120 and tape drive 130 connected to network 115. In example embodiments, computing environment 100 may include other computing devices (not shown) such as smartwatches, cell phones, smartphones, wearable technology, phablets, tablet computers, laptop computers, desktop computers, other computer servers or any other computer system known in the art, interconnected with computing device 120 and tape drive 130 over network 115.

In example embodiments, computing device 120 and tape drive 130 may connect to network 115, which enables computing device 120 and tape drive 130 to access other computing devices and/or data not directly stored on computing device 120 and tape drive 130. Network 115 may be, for example, a local area network (LAN), a telecommunications network, a wide area network (WAN) such as the Internet, or any combination of the three, and include wired, wireless, or fiber optic connections. Network 115 may include one or more wired and/or wireless networks that are capable of receiving and transmitting data, voice, and/or video signals, including multimedia signals that include voice, data, and video information. In general, network 115 may be any combination of connections and protocols that will support communications between computing device 120, tape drive 130, and any other computing device connected to network 115, in accordance with embodiments of the present invention. In an embodiment, data received by another computing device in computing environment 100 (not shown) may be communicated to computing device 120 and tape drive 130 via network 115.

In embodiments of the present invention, computing device 120 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, computing device 120 represents a computer system utilizing clustered computers and components (e.g., database server computers, application server computers, etc.) that act as a single pool of seamless resources when accessed by elements of computing environment 100. In general, computing device 120 is representative of any electronic device or combination of electronic devices capable of executing computer readable program instructions. Computing environment 100 may include any number of computing devices 120. Computing device 120 may include components as depicted and described in further detail with respect to FIG. 4, in accordance with embodiments of the present invention.

In an embodiment, computing device 120 includes user interface 122. According to embodiments of the present invention, user interface 122 provides an interface between a user of computing device 120, network 115 and any other devices connected to network 115. In an embodiment, user interface 122 allows a user of computing device 120 to interact with tape drive 130. In general, a user interface is the space where interactions between humans and machines occur. User interface 122 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 122 may also be mobile application software that provides an interface between a user of computing device 120 and network 115. Mobile application software, or an "app," is a computer program designed to run on smartphones, phablets, tablet computers and other mobile devices.

In embodiments of the present invention, tape drive 130 may be a data storage device that reads and writes data records, via a tape head, on a magnetic tape medium. The magnetic tape medium is held by two reels and the magnetic tape medium may be fully wound on either of the two reels or partially wound on each reel. Data records are written to or read from the magnetic tape medium by passing the magnetic tape medium under the tape head. When a read command is received by tape drive 130, the tape medium may need to change position, relative to the tape head, in order to read the first data record of the requested data records. Tape drive 130 may use a Linear Tape File System (LTFS) that allows files stored on the magnetic tape medium to be accessed as if the magnetic tape medium is a hard disk drive (HDD) or a removable flash drive, such as a universal serial bus (USB) flash drive. When LTFS is used, the magnetic tape medium is partitioned into an index partition and data partition. Here, each LTFS index recorded on the magnetic tape medium includes a pointer that points to a first data block of a file in the data partition, and includes additional metadata for the respective data block. Magnetic tape data storage is typically used for offline, archival data storage. Tape media generally has a favorable unit cost and a long archival stability. A tape drive provides sequential access storage, unlike a hard disk drive, which provides direct access storage. A disk drive can move to any position on the disk in a few milliseconds, but a tape drive must physically wind tape between reels to read any one particular piece of data. As a result, tape drives have very slow average seek times to data. However, tape drives can stream data very quickly, at speeds comparable to hard disk drives, off the tape when it hits the right position.

In an embodiment, tape drive 130 includes tape drive program 132. According to embodiments of the present invention, tape drive program 132 may be a program, a subprogram (e.g., a command) of a larger program, an application, a plurality of applications, or mobile application software, which functions to control tape drive 130 and to retrieve data from a tape drive. A program may generally be understood as a sequence of instructions written by a programmer to perform a specific task. Tape drive program 132 may run by itself but may be dependent on system software (not shown) to execute. In one embodiment, tape drive program 132 functions as a stand-alone program residing on tape drive 130. In another embodiment, tape drive program 132 may be part of computing device 120. In yet another embodiment, tape drive program 132 may work in conjunction with other programs, applications, etc., found on computing device 120, tape drive 130, or in computing environment 100. In yet another embodiment, tape drive program 132 may be found on other computing devices (not shown) in computing environment 100 which are interconnected to computing device 120 and tape drive 130 via network 115.

According to embodiments of the present invention, tape drive program 132 functions to control tape drive 130 and to retrieve data from a tape drive. According to an embodiment of the present invention, tape drive program 132 uses the sub-program "Bulk Read" to determine the order of reading of data records, which allows computing device 120 to read the data records without regard to the positions of the data records on the tape medium.

Figure 2:
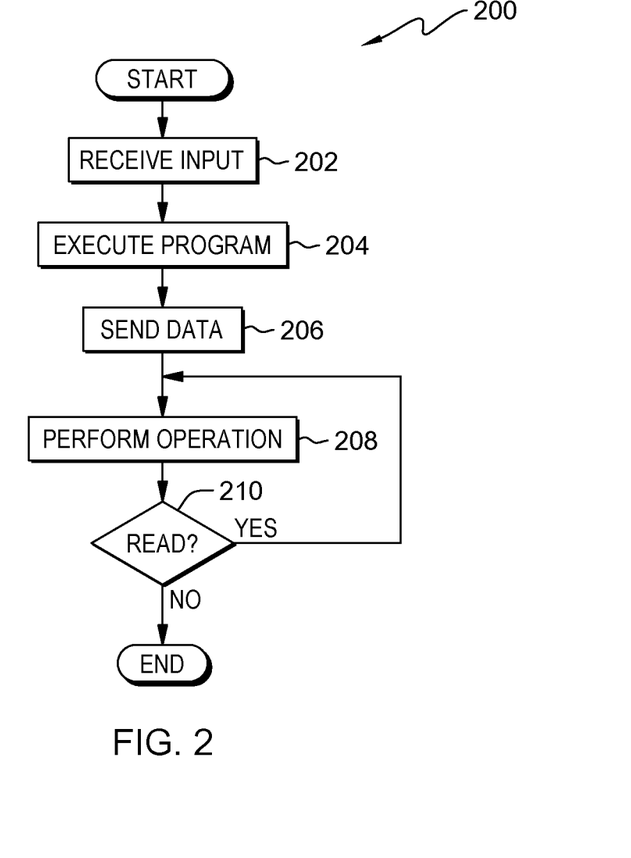
FIG. 2 depicts a flowchart of a program for retrieving data from a tape drive, in accordance with an embodiment of the present invention.

FIG. 2 is a flowchart of workflow 200 depicting a method for retrieving data from a tape drive, in accordance with an embodiment of the present invention. In one embodiment, the method of workflow 200 is performed by tape drive program 132. In an alternative embodiment, the method of workflow 200 may be performed by any other program working with tape drive program 132. In an embodiment, a user, via user interface 122, may invoke workflow 200 upon the user defining data records to be retrieved. In an alternative embodiment, a user, via user interface 122, may invoke workflow 200 upon accessing tape drive program 132.

In an embodiment, tape drive program 132 receives input (202). In other words, tape drive program 132 receives input from a user of a host device via a user interface requesting specific data records, stored to the magnetic tape, be read. In an embodiment, the specific format of the input of the data records to be read is (X, Y) where X is the earlier data record, in a group of data records, written on the tape and Y is latter data record, in the group of data records, written on the tape. For example, consider the group of ten data records from data record 501 to data record 510. In order to retrieve data record 503 through data record 507, a user would format the request as (503, 507). In an embodiment, there may be a single set of data records (X, Y) to be read. In another embodiment, there may be more than multiple sets of data records (X, Y) to be read [e.g., $(X_1, Y_1)$, $(X_2, Y_2)$, ... $(X_N, Y_N)$], where $X_1$, $X_2$, and $X_N$ are the initial data records in the set of data records. In an embodiment, the record number indicates the order in which the data records were written to the tape medium. In the example above, for data records 501 to 510, data record 501 is the first record written and data record 510 is the last record written. In an embodiment, a user of computing device 120 inputs a request, via user interface 122, to retrieve data records (X, Y) from tape drive 130.

In another embodiment, the specific format of the input of the data records to be read is {X, Y} where X is the first record to be read and Y is the number of records from X to read. For example, consider data records 101 through 120. To read data records 106 through 110, the format of the input would be {106, 5}.

In yet another embodiment, the specific format of the input of the data records to be read is [$X_1$, $Y_1$] where $X_N$ is the offset from $X_{N-1}$ and $Y_N$ is the number of data records to be read. For example, consider data records 0 through 1100 with the position of the tape medium at record 0. To read data record 100 through data record 110 and data records 1000 through data records 1020, the format of the input would be [100, 10] and [900, 20]. In this example, $X_1$ is the offset from $X_0$ (100−0=100), and $Y_1$ is the number of data records (110−100=10). Similarly, $X_2$ is the offset from $X_1$ (1000−100=900) and $Y_2$ is the number of records (1020−1000=20).

In an embodiment, tape drive program 132 executes a program (204). In other words, tape drive program 132 executes the sub-program "Bulk Read" to determine the read order, in the shortest amount of time, of the data records to be read. In an embodiment, the sub-program "Bulk Read" is part of tape drive program 132. In another embodiment, the sub-program "Bulk Read" is a stand-alone program stored to tape drive 130. In yet another embodiment, the sub-program "Bulk Read" is a stand-alone program stored to computing device 120. In yet another embodiment, the sub-program "Bulk Read" is a stand-alone program stored to any other computing device in computing environment 100 that is accessible by tape drive program 132 via network 115. In an embodiment, the read order is based on the position of the tape head relative to the current position of the tape medium (i.e., the specific data record nearest the position of the tape head), the position of the various data records to be read relative to one another and the size of the various data records to be read. In other words, "Bulk Read" determines the starting point (i.e., the first data record, of the requested data records, to be read) that results in the shortest overall read time to read all of the requested data records. In an embodiment, the read order may be determined by the "nearest neighbor algorithm". Here, the data record with the shortest distance from the current position of the tape head is placed first in the read order. The data record with the shortest distance from the end of the data record placed first in the read order is placed second in the read order. This process repeats until all of the data records have been placed in a read order. In another embodiment, the read order may be modified by using the "pairwise exchange algorithm". Here, the data record in the last position of the read order, as determined by the nearest neighbor algorithm, is placed in all other possible positions in the determined read order. The read order with the shortest seek time (i.e., the total distance between data records in a given read order) is selected as the new read order. This process is repeated until the data record placed in the last position in the read order does not change. In an embodiment, tape drive program 132, via the "Bulk Read" sub-program, determines the read order of the requested data records stored to a tape medium, such that the read is completed in the shortest amount of time.

In an embodiment, tape drive program 132 sends data (206). In other words, responsive to determining the read order of the data records via "Bulk Read", tape drive program 132 sends the read order to the host device. The read order is needed by the host device so that the host drive can arrange the data records in the correct order once all of the requested data records have been read. For example, consider that "A" is stored to data record 100, "B" is stored to data record 101, "C" is stored to data record 102, and "D" is stored to data record 103. If "Bulk Read" determines a read order of 103, 100, 101, and 102, then the data returned to the host device would be "DABC". Due to the fact that the host device has received the read order from the tape drive, the host device is able to correctly order the data as "ABCD", which is the original order that the data was written to the tape medium. In an embodiment, the determined read order is sent by tape drive program 132 from tape drive 130 to computing device 120.

In an embodiment, tape drive program 132 performs an operation (208). In other words, responsive to receiving a "Read" command from the host device, tape drive program 132 performs a "Locate" operation within the tape drive and reads the first data record in the order determined by "Bulk Read". The read order determined by "Bulk Read" may be in contrast to the conventional technology of reading the data records in the order the data records were written to the tape medium. Another "Read" command is executed by the host device and the second data record is read, possibly without needing another "Locate" command. This process is repeated until the last data record is read. In an embodiment, the read order determined by "Bulk Read" is the same as the order in which the data records were written resulting in no benefit from "Bulk Read" (i.e., the data records are not read any faster). In another embodiment, the read order determined by "Bulk Read" is different from the order the data records were written resulting in a benefit (i.e., saving time) from "Bulk Read". In an embodiment, responsive to receiving "Read" command from computing device 120, tape drive program 132 performs a "Locate" operation within tape drive 130 and reads the first data record in the order determined by "Bulk Read".

In an embodiment, tape drive program 132 determines whether another "Read" command has been received (decision 210). In other words, tape drive program 132 determines whether a new "Read" command has been received from the tape drive. In an embodiment (decision 210, YES branch), a new "Read" command has been received from tape drive 130; therefore, tape drive program 132 returns to 208 to continue reading the data records using the read order determined by "Bulk Read". In the embodiment (decision 210, NO branch), tape drive program 132 determines that a new "Read" command has not been received; therefore, tape drive program 132 ends the reading of the data records.

The present invention will now be described using tape medium configuration 300 examples shown in FIG. 3A, FIG. 3B, FIG. 3C, and FIG. 3D. In a first example depicted in FIG. 3A, the data records to be read are (101, 110) [i.e., data record 101 through data record 110] and the position of the tape head, relative to the tape medium, is current position 302A. Executing "Bulk Read" results in a read order of data record 101, followed by data record 102, then 103, 104, 105, 106, 107, 108, 109, and 110 (i.e., data record 101 through data record 110). However, in a second example in FIG. 3A, if the same data records are to be read but the tape head is in current position 304A, the read order determined by "Bulk Read" is data record 108 through data record 110 followed by data record 101 through data record 107. In both the first example and the second example, the read order is dictated by the position of the tape head relative to the requested data records. In other words, with the tape head at current position 302A, which is the beginning of data record 101, the data records are simply read in sequential order, starting with data record 101. However, with the tape head at the beginning of data record 108 (i.e., current position 304A), the first data record to be read is data record 108, followed by the other records in sequential order as this read order is the shortest overall read time since no wasted movement of the tape medium is needed.

Figure 3A:
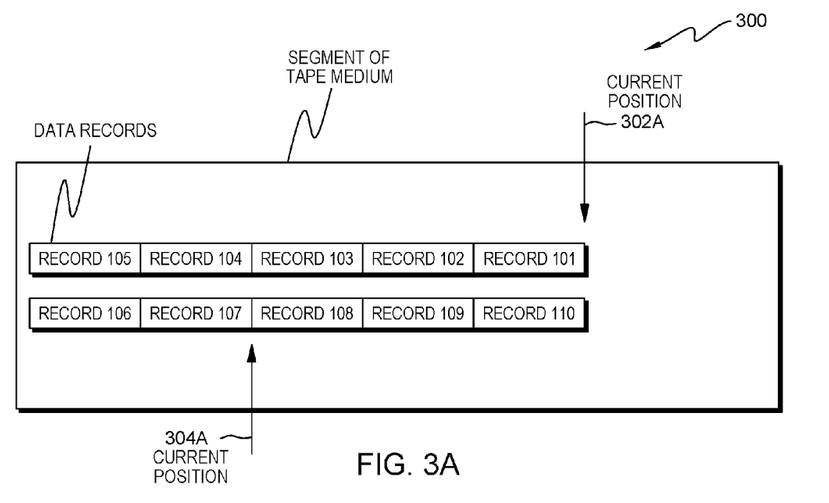
FIG. 3A, FIG. 3B, FIG. 3C, and FIG. 3D depict various configurations of data stored on a tape medium, in accordance with an embodiment of the present invention.
Figure 3B:
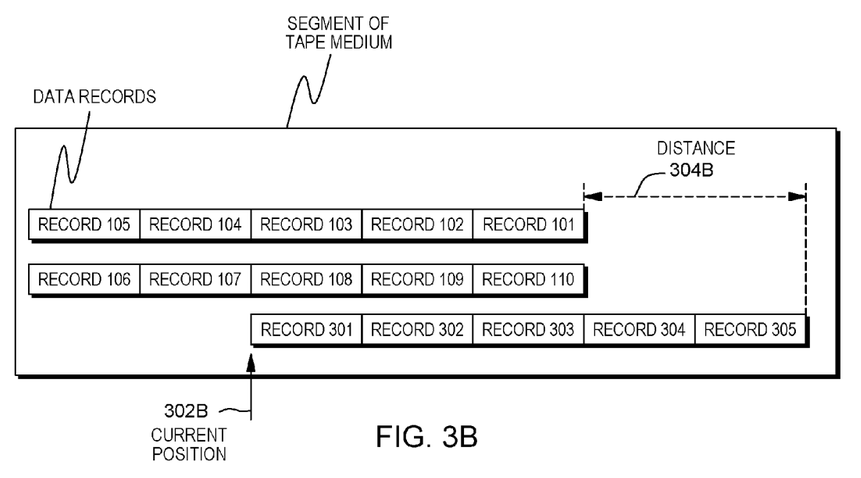

In the example depicted in FIG. 3B, data records 301 through 305 are added to the data records depicted in FIG. 3A. The beginning of data record 301 is at the same position on the tape medium as the beginning of data record 108. The position of the tape head, relative to the tape medium, is at current position 302B. With a request to read data records (101, 110) and (301, 305), "Bulk Read" would determine the read order as data record 108 through data record 110, data record 101 through data record 107, and data record 301 through data record 305 as this read order provides the shortest distance for the tape medium to travel and eliminates any wasted movement of the tape medium yielding the shortest overall read time. On the other hand, if the read order started with data record 301 instead of data record 108, there would be wasted movement of the tape medium when moving from the end of data record 305 to the beginning of data record 101 (distance 304B) which adds time to the overall read time.

Figure 3C:
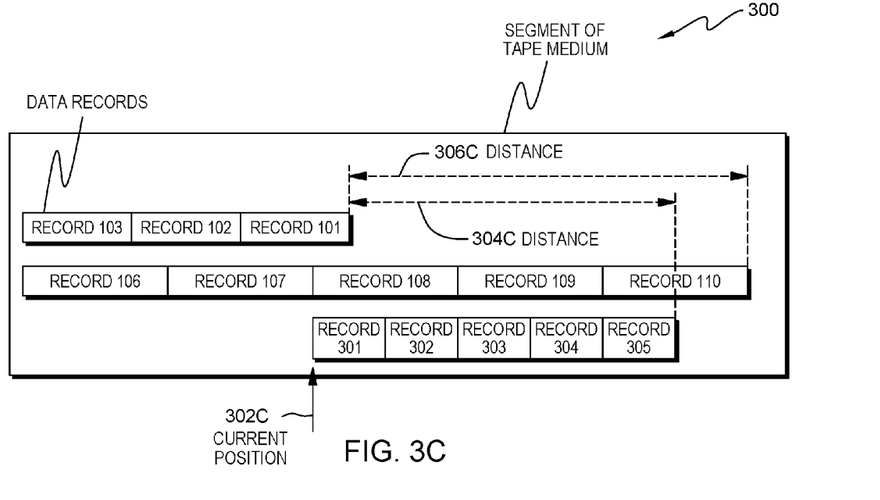

In the example depicted in FIG. 3C, data record 101 through data record 110 are stored to the tape medium (note that data record 104 and data record 105 are not shown) as are data record 301 through data record 305. Three sizes of data records are depicted. The position of the tape head, relative to the tape medium, is at current position 302C. With a request to read data records (101, 110) and (301, 305), "Bulk Read" would determine the read order as data record 301 through data record 305 followed by data record 101 through data record 110. "Bulk Read" started with data record 301 because distance 304C (the distance from the end of data record 305 to the beginning of data record 101) was less than distance 306C (the distance from the end of data record 110 to the beginning of data record 101. Alternatively, if "Bulk Read" started with data record 108, distance 306C would be traversed, wasted movement of the tape medium would not be minimized, and the shortest overall read time would not be achieved.

Figure 3D:
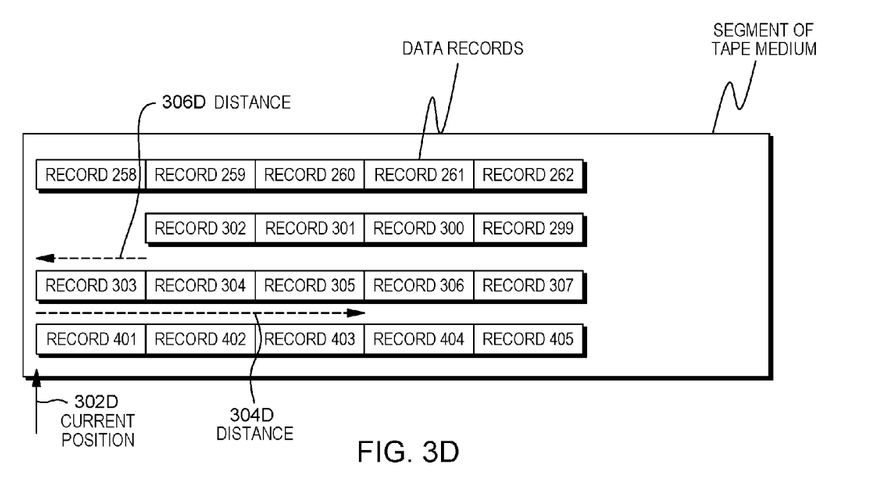

In the example depicted in FIG. 3D, the following data records are stored to tape medium: data record 258 through data record 262, data record 299 through data record 307, and data record 401 through data record 405. The position of the tape head, relative to the tape medium, is at current position 302D. With a request to read data records (301, 305), "Bulk Read" would determine the read order as data record 303, data record 304, data record 305, data record 301, and data record 302. This read order requires no wasted movement of the tape medium yielding the shortest overall read time. On the other hand, if the read order was executed in the same order that the data records were written (i.e., data record 301 through data record 305), the tape medium would first have to move the length of three data records (distance 304D) so that the tape head was positioned at the start of data record 301. After data record 302 was read, the tape medium would then need to travel the length of one data record (distance 306D) to the beginning of data record 303 to complete the read. It should be appreciated that the use of "Bulk Read" eliminates the wasted movement of the tape medium (i.e., distance 304D and distance 306D) and thereby decreases the overall read time.

Figure 4:
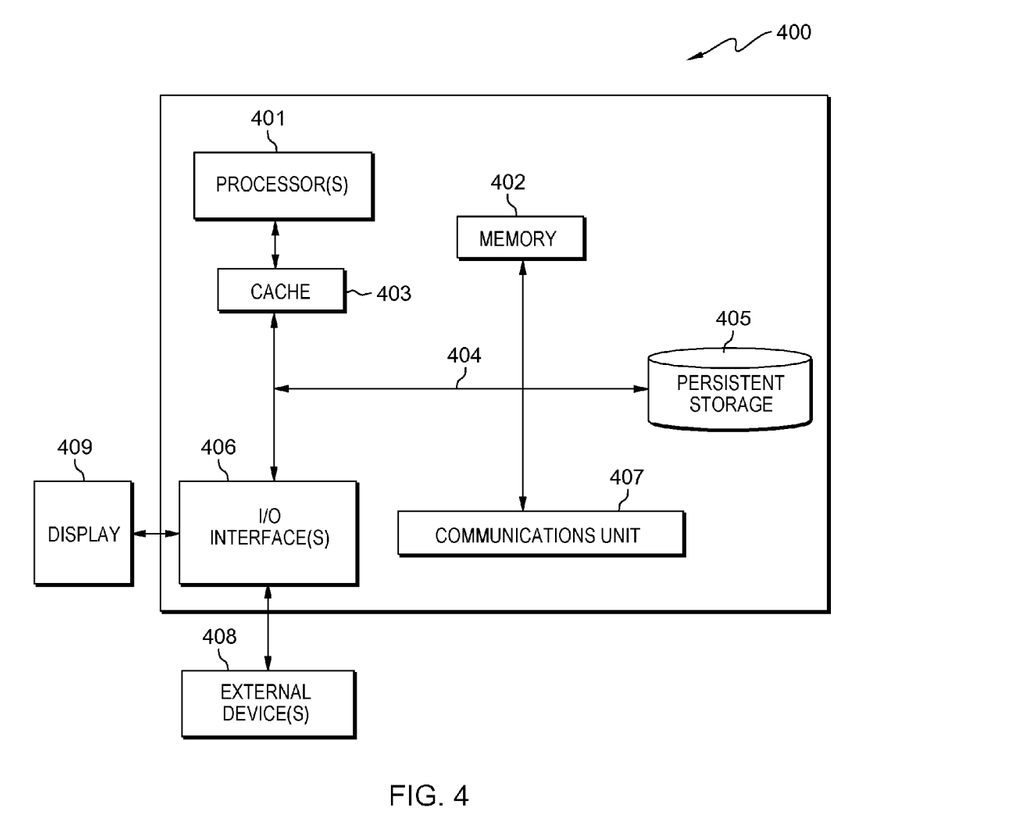
FIG. 4 depicts a block diagram of components of the computing environment of FIG. 1, in accordance with an embodiment of the present invention.

FIG. 4 depicts computer system 400, which is an example of a system that includes tape drive program 132. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method for retrieving data from a tape drive, the computer-implemented method comprising:
   receiving, by one or more computer processors, an input to read two or more data records stored to a tape medium on a tape drive, wherein:

the input is received in a specific format, and the specific format is selected from the group consisting of (X, Y), wherein X is the first data record to be read and Y is a last data record to be read; {X, Y}, wherein X is the first data record to be read and Y is a number of data records to be read; and [$X_1$, $Y_1$], wherein $X_N$ is an offset from $X_{N-1}$ and $Y_N$ is the number of data records to be read;

determining, by one or more computer processors, a starting point, wherein the starting point is a closest data record, of the two or more data records, to a current position of a tape head of the tape drive;

determining, by one or more computer processors, a read order of the two or more data records, wherein the read order is determined using an algorithm and the determined starting point;

sending, by one or more computer processors, the determined read order to a host device;

determining, by one or more computer processors, a first data record;

performing, by one or more computer processors, a first locate operation within the tape drive to locate the first data record, of the two or more data records, stored on the tape medium, based on the determined read order;

reading, by one or more computer processors, the first data record, of the two or more data records stored on the tape medium, based on the determined read order, and sending, by one or more computer processors, the first data record, of the two or more data records stored on the tape medium, to the host device.

2. The method of claim 1, wherein the operation of performing, by one or more computer processors, a first locate operation within the tape drive to locate the first data record, of the two or more data records, stored on the tape medium, based on the determined read order, comprises:

receiving, by one or more computer processors, a first read command, wherein the first read command is sent from the host device to the tape drive; and performing, by one or more computer processors, a first locate operation within the tape drive to locate the first data record, of the two or more data records stored on the tape medium, based on the determined read order.

3. The method of claim 1, wherein the algorithm is selected from the group consisting of a nearest neighbor algorithm and a pairwise exchange algorithm.

4. The method of claim 1, wherein the determined read order is used by the host device to arrange the two or more data records in a correct order, and wherein the correct order is an original order that the two or more data records were written to the tape medium.

5. The method of claim 1, wherein the read order is a shortest overall read time to read the two or more data records stored to the tape medium.

6. The method of claim 1, wherein the first data record is an initial data record in the determined read order of the two or more data records stored to the tape medium.

7. A computer program product for retrieving data from a tape drive, the computer program product comprising:

one or more computer readable storage media; and program instructions stored on the one or more computer readable storage media, the program instructions comprising:

program instructions to receive an input to read two or more data records stored to a tape medium on a tape drive, wherein:

the input is received in a specific format, and the specific format is selected from the group consisting of (X, Y), wherein X is the first data record to be read and Y is a last data record to be read; {X, Y}, wherein X is the first data record to be read and Y is a number of data records to be read; and [$X_1$, $Y_1$], wherein $X_N$ is an offset from $X_{N-1}$ and $Y_N$ is the number of data records to be read;

program instructions to determine a starting point, wherein the starting point is a closest data record, of the two or more data records, to a current position of a tape head of the tape drive;

program instructions to determine a read order of the two or more data records, wherein the read order is determined using an algorithm and the determined starting point;

program instructions to send the determined read order to a host device;

program instructions to determine a first data record;

program instructions to perform a first locate operation within the tape drive to locate the first data record, of the two or more data records, stored on the tape medium, based on the determined read order;

program instructions to read the first data record, of the two or more data records stored on the tape medium, based on the determined read order, and program instructions to send the first data record, of the two or more data records stored on the tape medium, to the host device.

8. The computer program product of claim 7, wherein the program instructions to perform a first locate operation within the tape drive to locate the first data record, of the two or more data records, stored on the tape medium, based on the determined read order, comprises:

program instructions to receive a first read command, wherein the first read command is sent from the host device to the tape drive; and program instructions to perform a first locate operation within the tape drive to locate the first data record, of the two or more data records stored on the tape medium, based on the determined read order.

9. The computer program product of claim 7, wherein the algorithm is selected from the group consisting of a nearest neighbor algorithm and a pairwise exchange algorithm.

10. The computer program product of claim 7, wherein the determined read order is used by the host device to arrange the two or more data records in a correct order, and wherein the correct order is an original order that the two or more data records were written to the tape medium.

11. The computer program product of claim 7, wherein the read order is a shortest overall read time to read the two or more data records stored to the tape medium.

12. The computer program product of claim 7, wherein the first data record is an initial data record in the determined read order of the two or more data records stored to the tape medium.

13. A computer system for retrieving data from a tape drive, the computer system comprising:

one or more computer processors;

one or more computer readable storage media; and program instructions stored on the one or more computer readable storage media for execution by at least one of the one or more computer processors, the program instructions comprising:

program instructions to receive an input to read two or more data records stored to a tape medium on a tape drive, wherein:

the input is received in a specific format, and the specific format is selected from the group consisting of (X, Y), wherein X is the first data record to be read and Y is a last data record to be read; {X, Y}, wherein X is the first data record to be read and Y is a number of data records to be read; and [$X_1$, $Y_1$], wherein $X_N$ is an offset from $X_{N-1}$ and $Y_N$ is the number of data records to be read;

program instructions to determine a starting point, wherein the starting point is a closest data record, of the two or more data records, to a current position of a tape head of the tape drive;

program instructions to determine a read order of the two or more data records, wherein the read order is determined using an algorithm and the determined starting point;

program instructions to send the determined read order to a host device;

program instructions to determine a first data record;

program instructions to perform a first locate operation within the tape drive to locate the first data record, of the two or more data records, stored on the tape medium, based on the determined read order;

program instructions to read the first data record, of the two or more data records stored on the tape medium, based on the determined read order, and program instructions to send the first data record, of the two or more data records stored on the tape medium, to the host device.

14. The computer system of claim 13, wherein the program instructions to perform a first locate operation within the tape drive to locate the first data record, of the two or more data records, stored on the tape medium, based on the determined read order, comprises:

program instructions to receive a first read command, wherein the first read command is sent from the host device to the tape drive; and program instructions to perform a first locate operation within the tape drive to locate the first data record, of the two or more data records stored on the tape medium, based on the determined read order.

15. The computer system of claim 13, wherein the algorithm is selected from the group consisting of a nearest neighbor algorithm and a pairwise exchange algorithm.

16. The computer system of claim 13, wherein the determined read order is used by the host device to arrange the two or more data records in a correct order, and wherein the correct order is an original order that the two or more data records were written to the tape medium.

17. The computer system of claim 13, wherein the read order is a shortest overall read time to read the two or more data records stored to the tape medium.

* * * * *